(12) United States Patent
Bertness et al.

(10) Patent No.: US 11,219,329 B2
(45) Date of Patent: Jan. 11, 2022

(54) SUGAR DISPENSER WITH AUGER

(71) Applicant: Marmon Foodservice Technologies, Inc., Osseo, MN (US)

(72) Inventors: Elizabeth Bertness, Batavia, IL (US); Michael Graef, Naperville, IL (US)

(73) Assignee: Marmon Foodservice Technologies, Inc., Osseo, MN (US)

(*) Notice: Subject to any disclaimer, the term of this patent is extended or adjusted under 35 U.S.C. 154(b) by 0 days.

(21) Appl. No.: 16/381,437

(22) Filed: Apr. 11, 2019

(65) Prior Publication Data

US 2019/0313834 A1    Oct. 17, 2019

Related U.S. Application Data

(60) Provisional application No. 62/656,708, filed on Apr. 12, 2018.

(51) Int. Cl.
    *A47J 31/40*     (2006.01)
    *B65D 83/06*     (2006.01)
    *G01F 11/24*     (2006.01)

(52) U.S. Cl.
    CPC ............ *A47J 31/404* (2013.01); *B65D 83/06* (2013.01); *G01F 11/24* (2013.01)

(58) Field of Classification Search
    CPC ......... A47J 31/404; B65D 83/06; G01F 11/24
    USPC ................................................. 222/410–414
    See application file for complete search history.

(56) References Cited

U.S. PATENT DOCUMENTS

| 2,279,640 | A | * | 4/1942 | Reinhold ................. B65B 1/18 222/252 |
|---|---|---|---|---|
| 2,800,252 | A |  | 7/1957 | Wahl |
| 3,093,271 | A |  | 6/1963 | Douglas |
| 3,211,334 | A |  | 10/1965 | McShea |
| 3,446,399 | A |  | 5/1969 | Ross et al. |
| 4,195,753 | A |  | 4/1980 | Dyer |
| 4,207,995 | A |  | 6/1980 | Neely |
| 4,723,614 | A |  | 2/1988 | Lahti |
| 4,974,751 | A |  | 12/1990 | King |
| 5,063,757 | A |  | 11/1991 | Ikeda et al. |
| 5,217,108 | A |  | 6/1993 | Newnan |

(Continued)

FOREIGN PATENT DOCUMENTS

| CA | 2501127 | 3/2005 |
|---|---|---|
| CA | 2582130 | 10/2011 |

(Continued)

OTHER PUBLICATIONS

International Search Report and Written Opinion issued in corresponding PCT/US2019/026921, dated Jun. 19, 2019.

(Continued)

*Primary Examiner* — Jeremy Carroll
(74) *Attorney, Agent, or Firm* — Andrus Intellectual Property Law, LLP (57) ABSTRACT

Systems and apparatus for dispensing edible granular material for a beverage include a hopper. The hopper includes at least a floor defining a bottom of the hopper. An auger includes an auger shaft, is positioned at the bottom of the hopper, and extends horizontally from the hopper. A tube is connected to the hopper and surrounds at least a portion of the auger. The tube extends away from the hopper. An outlet through the tube is located at an end of the tube distal from the hopper.

15 Claims, 10 Drawing Sheets

(56) References Cited

U.S. PATENT DOCUMENTS

| | | |
|---|---|---|
| 5,241,898 A | 9/1993 | Newnan |
| 5,287,993 A | 2/1994 | Ford et al. |
| 5,341,961 A | 8/1994 | Hausam |
| 5,375,744 A | 12/1994 | Henderson |
| 5,791,526 A | 8/1998 | Landais et al. |
| 5,871,619 A | 2/1999 | Finley et al. |
| 5,918,768 A | 7/1999 | Ford |
| 5,927,553 A | 7/1999 | Ford |
| 6,182,555 B1 | 2/2001 | Scheer et al. |
| 6,250,506 B1 | 6/2001 | Geiger et al. |
| 6,253,959 B1 | 7/2001 | Gaultney et al. |
| 6,289,948 B1 | 9/2001 | Jeannin et al. |
| 6,382,470 B1 | 5/2002 | Hu et al. |
| 6,516,973 B2 | 2/2003 | Chrisman et al. |
| 6,550,648 B2 | 4/2003 | Bardin |
| 6,679,402 B1 | 1/2004 | D'alayer De Costemore D'Arc |
| 6,698,624 B2 | 3/2004 | Ufheil et al. |
| 6,834,779 B2 | 12/2004 | Ufheil et al. |
| 6,932,245 B2 | 8/2005 | Whippie et al. |
| 7,275,664 B2 | 10/2007 | Pickrell |
| 7,337,920 B2 | 3/2008 | Duck et al. |
| 7,398,725 B2 | 7/2008 | Rebordosa et al. |
| 7,441,495 B2 | 10/2008 | Halle et al. |
| 7,912,579 B2 | 3/2011 | Stettes |
| 8,420,148 B2 | 4/2013 | Illsley et al. |
| 8,444,012 B2 | 5/2013 | Bergdahl et al. |
| 8,561,841 B2 | 10/2013 | Erman et al. |
| 8,579,166 B2 | 11/2013 | Bernhardsgruetter et al. |
| 8,622,257 B2 | 1/2014 | Erman et al. |
| 8,695,483 B2 | 4/2014 | Koopman et al. |
| 8,915,406 B2 | 12/2014 | Hu et al. |
| 9,161,653 B2 | 10/2015 | Rey et al. |
| 9,296,603 B1 | 3/2016 | Cole et al. |
| 9,561,909 B2 | 2/2017 | Van Der Woning |
| 9,750,366 B2 | 9/2017 | Mabrouki |
| 9,782,034 B2 | 10/2017 | Williston et al. |
| 2003/0234261 A1* | 12/2003 | Ufheil .................. A47J 31/404 222/220 |
| 2005/0236429 A1 | 10/2005 | Duck et al. |
| 2007/0218181 A1 | 9/2007 | Illsley et al. |
| 2007/0261566 A1* | 11/2007 | Varney .................. A47J 31/404 99/300 |
| 2009/0250491 A1 | 10/2009 | Erman et al. |
| 2010/0065587 A1 | 3/2010 | Erman et al. |
| 2013/0126556 A1* | 5/2013 | Riester .................. A23G 9/22 222/135 |
| 2013/0224364 A1 | 8/2013 | Illsley et al. |
| 2015/0079264 A1 | 3/2015 | Illsley et al. |
| 2016/0362290 A1 | 12/2016 | Cole et al. |
| 2017/0000288 A1 | 1/2017 | Dubief et al. |
| 2017/0119199 A1 | 5/2017 | Williston et al. |
| 2017/0122444 A1 | 5/2017 | Wilson et al. |
| 2017/0122449 A1 | 5/2017 | Wilson et al. |
| 2017/0122450 A1 | 5/2017 | Wilson et al. |
| 2017/0122451 A1 | 5/2017 | Wilson et al. |
| 2017/0123509 A1 | 5/2017 | Erman et al. |
| 2017/0233180 A1* | 8/2017 | Swanson ................ B65D 83/06 222/234 |
| 2017/0238754 A1 | 8/2017 | Mieville et al. |
| 2018/0008085 A1 | 1/2018 | Dubief et al. |
| 2018/0008086 A1 | 1/2018 | Dubief et al. |
| 2020/0037809 A1 | 2/2020 | Wassink et al. |

FOREIGN PATENT DOCUMENTS

| | | |
|---|---|---|
| CA | 2667383 | 9/2014 |
| CA | 2662872 | 11/2015 |
| CA | 2924208 | 5/2016 |
| CA | 2910814 | 2/2017 |
| CA | 2910818 | 7/2017 |
| CA | 2895730 | 9/2017 |
| CA | 2896144 | 10/2017 |
| CA | 2946978 | 7/2018 |
| CA | 2946946 | 8/2018 |
| CA | 2946985 | 9/2018 |
| CN | 201325740 | 10/2009 |
| EP | 3031367 A1 | 6/2016 |
| WO | 2008028294 | 3/2008 |
| WO | 2008049222 | 5/2008 |
| WO | 2016197235 | 12/2016 |
| WO | 2017070774 | 5/2017 |
| WO | 2017070778 | 5/2017 |
| WO | 2017070781 | 5/2017 |
| WO | 2017108451 | 6/2017 |
| WO | 2017108509 | 6/2017 |

OTHER PUBLICATIONS

RE46143, Erman et al., "Cartridge based fluid dispensing apparatus" of Sep. 13, 2016.

* cited by examiner

SUGAR DISPENSER WITH AUGER

CROSS-REFERENCE TO RELATED APPLICATIONS

The present application claims priority of U.S. Provisional Patent Application No. 62/656,708, filed on Apr. 12, 2018, the contents of which is hereby incorporated by reference in its entirety.

BACKGROUND

As restaurants, concessions, and vending services move towards increased customized product offerings and consumers look for a more personalized culinary experience in a quick service food and beverage setting, food service providers menus and order customization options have greatly expanded. This increases complexity in assembling the customers order and increases the time required for food service workers to prepare and assemble the order for delivery to the customer. Improved solutions for the preparation of customer orders by food service workers or for customers to customize orders themselves are thus desired in the field. Coffee and other somewhat hot or cold beverages (e.g. tea, iced coffee, iced tea) have become common staples of quick service food and beverage offerings. With a wide variety of additives, for example creamers sweeteners, or flavorings, such a beverage can be tailored to the tastes of an individual customer.

However, this variety of beverages and customization options increase the complexity of order preparation by a worker and therefore systems that provide improved completion of these beverage orders are desirable. One existing challenge in this area is the repeatable and accurate mechanical and/or automated dispense of granulated or powdered additives. Attempts have been made to provide such dispensing systems, yet the present disclosure improves upon those attempts. Examples of these previous attempts are provided below, the disclosures of which are each incorporated by reference herein in their entireties.

U.S. Pat. No. 7,398,725 discloses a device for metering powdery, flaky, or fine-grained material. The device provides the material into a metering chamber to meter a portion at an outlet and the portion is discharged through the outlet by an air current generated by a blower.

U.S. Pat. No. 7,441,495 discloses a beverage machine in which a portion of a particulate material to be used in a beverage is moved using a conveyance system to a dispense chute.

U.S. Pat. No. 8,444,012 discloses a single piece device for storing, metering, and mixing a powder with a diluent. The device stores and meters a powder and mixes the powder with a diluent to prepare a food product. The device provides a powder dosing system and a powder duct with an integrated air system. The powder dosing system and the powder duct carries air and the powder to a mixing chamber in which the powder mixes with the diluent.

U.S. Pat. No. 8,622,257 discloses an auger-driven powder dispenser for dispensing granulated powder, such as a fine sugar or sweetener. The dispenser has an inclined base and an auger member abutting the base of the storage bin and a dispensing chute. The base of the storage bin is inclined positively toward to the orifice of the dispensing chute.

U.S. Pat. No. 8,915,406 discloses a dosing unit for a powder dispenser. The dosing unit includes two dosing chambers, each with an upstream inlet and a downstream outlet. Means are provided to open and close the respective upstream inlets and downstream outlets, and those means are operated reciprocally to simultaneously fill one dosing chamber while dispensing from the other dosing chamber.

BRIEF DISCLOSURE

Disclosed herein are exemplary embodiments of auger based systems for the dispense of granulated additives, particularly dispensers for granulated additives to beverages. These additives may be most commonly granulated sugar, in other embodiments, such additives may be non-sugar sweeteners (e.g. Splenda or Stevia), powdered creamer, or powdered flavoring (e.g. cinnamon or cocoa). In still further exemplary embodiments, systems and devices for providing automated completion of customized beverage orders are disclosed.

An exemplary embodiment of a dispenser of portioned edible granular material for a beverage includes a hopper configured to receive the edible granular material. The hopper includes at least a floor defining a bottom of the hopper. An auger includes an auger shaft. The auger shaft has a shaft diameter and at least one flight about the shaft. The auger is positioned at the bottom of the hopper and extends horizontally from the hopper. A tube is connected to the hopper and surrounds at least a portion of the auger. The tube extends away from the hopper. An outlet through the tube is located at an end of the tube distal from the hopper.

In further exemplary embodiments of the dispenser, the shaft diameter varies along the length of the auger shaft. The shaft diameter may taper along the length of the auger shaft from a hopper end of the auger shaft to an outland end of the auger shaft. The auger may maintain a constant outer diameter of the auger along the length of the auger. The at least one flight may be a single flight with a pitch distance between flight portions at a same rotational position about the auger. The pitch distance may vary along the length of the auger. The pitch distance may increase along the length of the auger from the hopper end to the outlet end of the auger.

An exemplary embodiment of the dispenser may include a sensor positioned within the hopper. The sensor may be directed into and interior of the hopper at the edible granular material. A processor may be communicatively connected to the sensor and the processor receives a signal from the sensor. The processor determines an amount of edible granular material remaining with the hopper from the signal from the sensor and the processor produces an indication of the determined amount of edible granular material remaining within the hopper.

In an exemplary embodiment, the at least one flight of the auger has a pitch distance between flight portions at a same rotational position about the auger and the pitch distance varies along the length of the auger. The at least one flight may have a variable flight angle relative to an axis of the auger shaft along the length of the shaft.

An exemplary embodiment of a dispenser may include an outlet with a curved edge and a profile of the curved edge matches a portion of the last least one flight that rotates past the curved edge. The auger may include a wiper blade that extends from the at least one flight along a length of the auger shaft at a region about the outlet.

An exemplary embodiment of a dispenser may further include an electric motor connected to the auger shaft of the auger and the electric motor is operable to selectively rotate the auger. A processor may be communicatively connected to the motor and operable to operate the motor. The processor may receive at least one input regarding dispense of edible granular material. The processor may operate the electric motor to rotate the auger through a plurality of rotations according to the at least one input to dispense the portion of the edible granular material. The electric motor may be operated by the processor to rotate the auger to advance the edible granular material between successful flight portions of the auger to the outlet for dispense. The processor may operate the electric motor to stop rotation of the auger with a flight portion of the auger advanced ahead of a curved edge of the outlet. A user interface may be communicatively connected to the processor. The user interface may be operable to receive a user import regarding a dispense of the edible granular material and the user input is communicated to the processor.

In an exemplary embodiment of a system for dispensing additives into a beverage, the system includes a first dispense location. The first dispense location is configured to receive a beverage receptacle. The system further includes a granular dispenser for dispensing the portioned edible granular material into the beverage receptacle at the first dispense location. The granular dispenser includes a hopper configured to receive the edible granular material. The hopper includes at least a floor defining a bottom of the hopper. The granular dispenser includes an auger comprising an auger shaft having a shaft diameter and at least one flight about the shaft. The auger is positioned at the bottom of the hopper and extends horizontally from the hopper. The granular dispenser includes a tube that is connected to the hopper. The tube surrounds at least a portion of the auger. The tube extends away from the hopper. The granular dispenser includes an outlet through the tube located at an end of the tube distal from the hopper and oriented relative to the first dispense location. The granular dispenser includes an electric motor connected to the auger shaft of the auger and operable to selectively rotate the auger to dispense the portion of edible granular material from the hopper to the first dispense location. The system for dispensing additives into a beverage further includes a processor communicatively connected to the electric motor and operable to control the motor to dispense the portion of edible granular material.

In a further exemplary embodiment of the system for dispensing additives into a beverage, the granular dispenser is a first granular dispenser and the system further includes a second granular dispenser for dispensing portioned edible granular material into the beverage receptacle at the first dispense location. The second granular dispenser further includes a hopper configured to receive the edible granular material, the hopper includes at least a floor defining a bottom of the hopper. An auger includes an auger shaft having a shaft diameter and at least one flight about the shaft. The auger is positioned at the bottom of the hopper and extends horizontally from the auger. A tube is connected to the hopper and surrounds at least a portion of the auger. The tube extends away from the hopper. An outlet through the tube is located at an end of the tube distal from the hopper and oriented relative to the first dispense location. An electric motor is connected to the auger shaft end of the auger and operable to selectively rotate the auger to dispense the portion of edible granular material from the hopper to the first dispense location. The processor may be communicatively connected to the electric motor of the second granular dispenser and is operable to control the electric motor of the second granular dispenser to dispense the portion of edible granular material from the hopper of the second granular dispenser to the first dispense point.

Exemplary embodiments of the system for dispensing additives into a beverage includes a kitchen management system (KMS). The KMS receives customer orders and identifies instructions for edible granular materials in the customer orders. The instructions for the edible granular material are provided form the KMS to the processor. The processor operates the electric motor to dispenser the portion of edible granular material form the hopper to the first dispense point.

In an exemplary embodiment of the system for dispensing additives into a beverage further includes a creamer dispenser. The creamer dispenser may include s refrigerated cabinet within which a source of creamer is stored in an environmentally controlled condition. A flexible tube may extend from the source of creamer to the first dispense point. At least one pinch valve may selectively occlude the flexible tube. A peristaltic pump may be arranged about the flexible tube and operable to move a portion of creamer from the source, through the tube to dispense the portion of creamer at the first dispense point. The processor may be communicatively connected to the peristaltic pump and operates the peristaltic pump to control a dispense of creamer according to a customer order.

In a still further exemplary embodiment, the system for dispensing additives into a beverage further includes a flavoring dispenser. The flavoring dispenser includes a flavoring container that is filled with liquid flavoring. A flexile tube extends from the flavoring container to the first dispense point. At least one pinch valve selectively occludes the flexible tube. A peristaltic pump is arranged about the flexible tube and operable to move a portion of the liquid flavoring from the flavoring container, through the tube to dispense the portion of liquid flavoring at the first dispense point. The processor may be communicatively connected to the peristaltic pump and operates the peristaltic pump to control a dispense of liquid flavoring according to a customer order.

DETAILED DISCLOSURE

Figure 1:
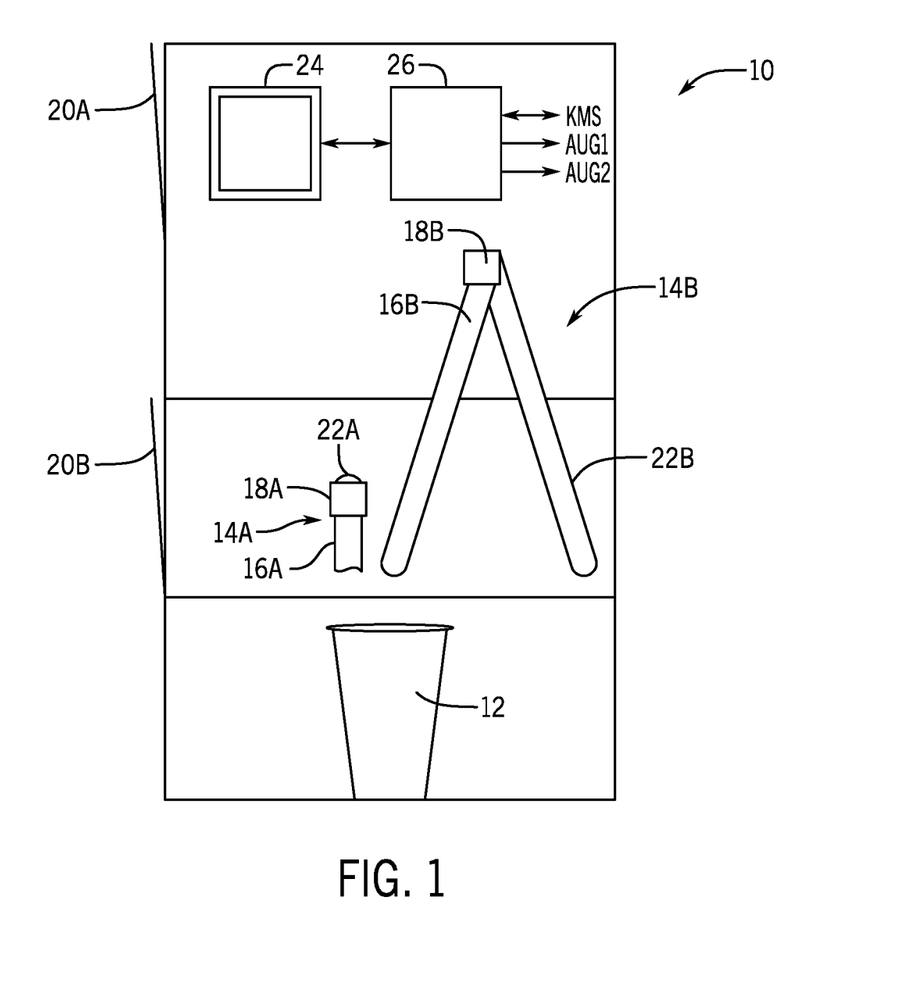
FIG. 1 depicts an exemplary embodiment of a granular dispenser.

FIG. 1 depicts an exemplary embodiment of a granular dispenser 10. The granular dispenser 10 depicted in FIG. 1 is diagrammatic in nature and intended to be general in disclosure and not intended to be limiting on the arrangements or configurations of granular dispensers as disclosed in further detail herein. The granular dispenser 10 is arranged to dispense a granular substance, for example sugar, non-sugar sweetener, powdered creamer, cinnamon, or cocoa into a cup 12 or other receptacle. It will be recognized that in embodiments, the cup 12 may be either filled with a beverage to be delivered to a customer or the base beverage (e.g. coffee) may be dispensed into the cup after the granular additives have been dispensed into the cup 12.

Exemplarily, the granular dispenser 10 includes at least one dispensing system 14. As depicted in FIG. 1, the dispenser 10 may include two dispensing systems 14A, 14B. It will be recognized that in other embodiments, more or fewer dispensing systems may be used in an embodiment of a granular dispenser 10. In embodiments of granular dispensers 10 as described herein with more than one dispensing system 14 the dispensing systems 14 may be similarly configured or may include dispensing systems with different configurations of the components as described herein. Two examples of dispensing systems are provided in FIG. 1, a dispensing system 14A with a short, vertical dispensing tube 16A and a dispensing system 14B with an elongated, angled dispensing tube 16B. Other variations of dispensing tubes will be recognized between these two exemplary embodiments. As will be described in further detail herein, an auger (not depicted) within the dispensing system 14 can be horizontal or angled, and such orientation of the auger may be independent of the construction and orientation of the associated dispensing tube 16. The respective dispensing tubes 16A, 16B directs the granular substance from an auger outlet 18A, 18B into the cup 12. The inventors have discovered that an angle greater than 35 degrees for the dispensing tube 16A, 16B can facilitate dispensing of granular substances without clogging the dispensing tube 16A, 16B. In other embodiments, an angle between 45 and 90 degrees may be used. In still further exemplary embodiments an angle between 60 and 90 degrees is preferred. While not depicted in FIG. 1, the granular dispenser 10 includes hoppers within which the granular substances are stored. In an embodiment, doors 20A, 20B are openable to provide access to fill the hoppers with the granular substances. Embodiments of the doors 20A, 20B may facilitate as ramps, funnels, or chutes to direct the granular material into the respective hoppers.

The granular dispenser 10 is exemplarily representative of two different auger arrangements as will be described in further detail herein. The dispensing system 14A is exemplarily representative of a generally horizontally oriented auger assembly 22A to dispense portions of the granular material from the hopper interior of the granular dispenser 10 out of the auger outlet 18A. The dispensing system 14B includes an auger assembly 22B that is arranged at an angle upwards greater than 45 degrees in a manner such that the granular material is elevated along the length of the auger assembly 22B to the auger outlet 18B at an elevated location. In such an embodiment, this provides the additional height such that the dispensing tube 16B can be oriented at an angle as described above facilitating dispense of the granular material. Another exemplary embodiment of the dispensing system 14B may use a horizontal auger assembly 22 instead, with the hopper arranged at the same or similar height as the auger outlet 18A.

The granular dispenser 10 exemplarily includes a user interface 24 which, in an embodiment, is a touch-sensitive graphical display. The user interface 24 is communicatively connected to a controller 26 which is exemplarily a computer processor that accesses and executes computer readable code to carry out functions as described herein including, but not limited to, operating a touch sensitive graphical display to present a graphical user interface 24 through which a user may interact with the granular dispenser 10 provide inputs and instructions thereto. In still further embodiments, the user interface 24 may be another form of user interface, including, but not limited to an infrared barcode scanner or an RF receiver. The controller 26, as noted above, is exemplarily a computer processor and upon receiving order instructions provides control signals to the auger or components thereof in order to carry out a requested dispense of a granular substance.

In still further embodiments, the controller 26 is communicatively connected to a kitchen management system (KMS) in which receives and stores the customers' orders. The KMS is communicatively connected to devices within the kitchen and operates to coordinate the assembly of items of the customer's order by providing instructions and/or commands to the various communicatively connected devices. In other embodiments, the KMS may operate one or more graphical displays to present a customer order, an order status, or components of the customer order. The KMS may also use information received from the devices in the kitchen to track kitchen inventory and use of food items. The granular dispenser 10 may receive information regarding the customer's orders directly from the KMS and proceed to automatedly dispense the granular substances as needed to complete the customer's orders queued in the kitchen management system.

Figure 2:
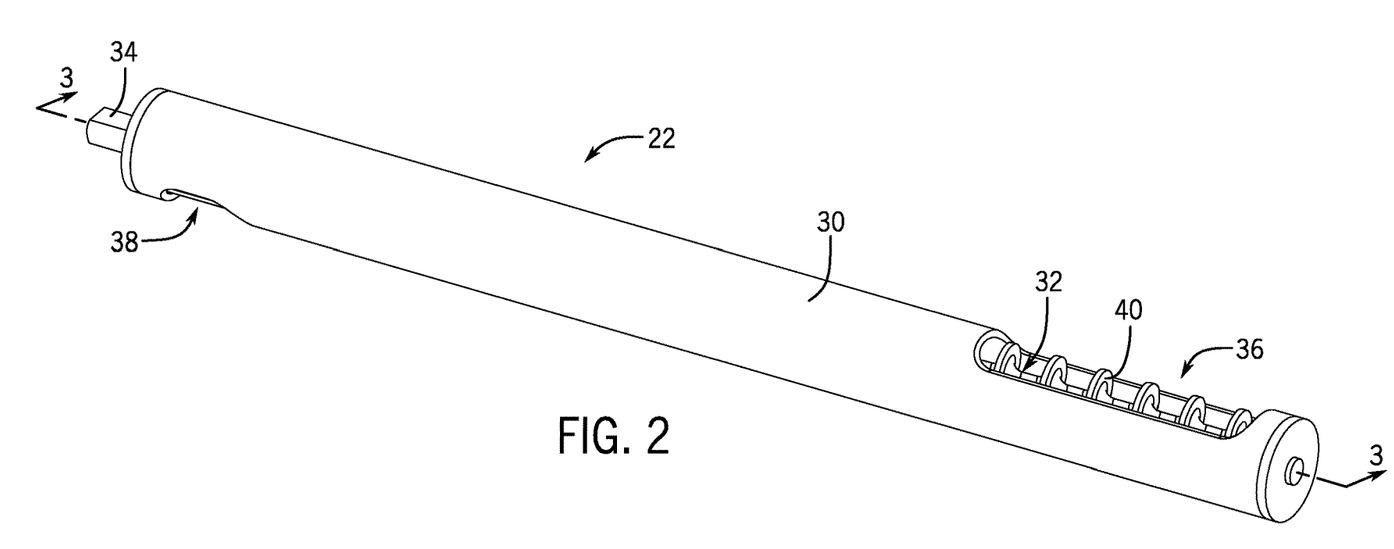
FIG. 2 is a perspective view of an exemplary embodiment of an auger assembly.

FIG. 2 is a perspective view of an exemplary embodiment of an auger assembly 22. The auger assembly 22 includes a tube 30 within which the auger 32 is retained. The auger 32 is rotated, for example by rotation of a shaft 34 by an electrical motor (not depicted). An auger inlet 36 is a localized opening through the tube 30. As will be shown in further detail herein, the auger inlet 36 is oriented relative to a hopper in which the granular material is stored prior to dispense. Granular material enters the interior of the auger assembly 22 through the auger inlet 36, with the granular material contained in the spaces between adjacent flights 40 of the auger 32. As the auger 32 rotates, the flights 40 push the granular material through the tube 30. At the opposite end of the tube 30, an auger outlet 38 is located through which the portions of a granular material are dispensed.

Figure 3:
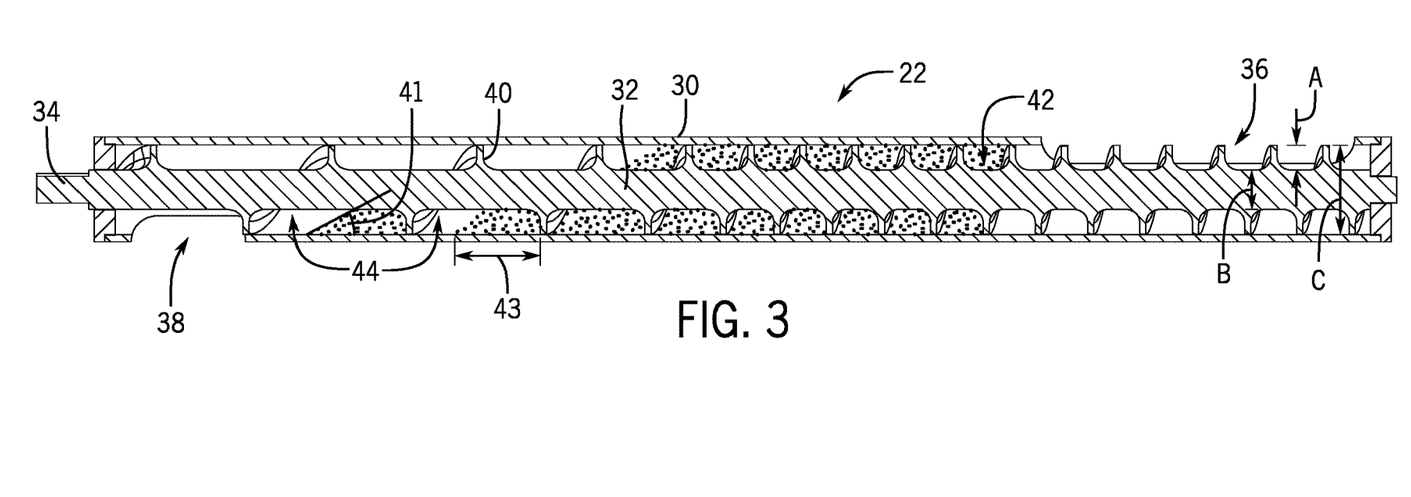
FIG. 3 is a sectional view of an exemplary embodiment of an auger assembly with variable flight pitch.

FIG. 3 is a cross sectional view of the auger assembly 22 depicted in FIG. 2. In an auger assembly, the auger 32 has a diameter (C) that is comprised of the flight 40 which has a width (A) being the radial distance from the shaft 34 to the outer circumference of the auger 32. The shaft 34 also has a diameter (B), therefore the diameter of the auger (C) is exemplarily represented as 2A+B=C. The spacing between the flight 40 at the same rotational position about the shaft 34 is the pitch of the flight, while the angle of the flight 40 relative to the shaft 34 is the flight angle. The auger 32 in FIGS. 2 and 3, is an exemplary embodiment of an auger in which the flight 40 is arranged with a variable pitch. The pitch of the flight 40 increases from the auger inlet 36 to the auger outlet 38. This provides the function of segmenting the granular material into portions. The portion size is defined by the spacing between a pushing portion of the flight 40 and a leading portion of the flight 40 at the auger inlet 36. The flight pitch may be consistent across the portion auger 32 adjacent the auger inlet. As shown in FIG. 3, after the auger inlet 36, the pitch of the flight 40 may begin to increase. It will be recognized that to successive portions of the granular material, each flight portion will be both a leading flight portion and a pushing flight portion. The spacing between flight portions defines a fixed volume that is filled with the granular material.

As the auger 32 is rotated within the tube 30, the portions of granular material remain of the same volume. The portions of granular material are pushed forward onto the flight with successively greater flight pitch. This creates additional space between the flight 40 relative to the fixed volume of the portion of the granular material. As will be described in embodiments herein, this space helps to provide a complete dispense of a portion without spill over from a subsequent portion. As can be seen in FIG. 3, the portion 42 of sugar is held between flight portions of the auger 32. As the flight pitch increases towards the auger outlet 38, the volume of the granulated substance is smaller than the volume between each rotation of the flight and the granular material settles against the face of the flight pushing the material and extends away from that flight at an angle of repose relative to an angle of the auger 32 and the tube 30. The angle of repose is also determined in part by the particular granular material. The length that the portion 42 of granular material extends is dependent upon the volume of the portion 42 and/or the flight angle. The pitch of the flight increases until the length between flight portions is greater than the length of the portion 42 of granular material. Therefore, in embodiments of the auger 32, the initial pitch of the flight and the final pitch of the flight in the variable pitch flight is dependent upon the desired portion size for each revolution of the auger 32. The initial pitch defines the volume of the portion, and the final pitch is greater than the distance that that volume of the portion will extend within the tube when pushed by the pushing flight portion.

In still further embodiments, the volume of the portion and the position of the portion of granular material within the auger may further be adjusted based upon the angle of the flight 40 relative to the shaft 34. The flight angle may be any angle greater than parallel to the axis of the shaft but less than perpendicular to the axis of the shaft. In still further embodiments, the flight angle may vary along the length of the auger 32. In such embodiments, the auger diameter may remain constant, while the flight angle increases or decreases along the length of the shaft 34.

Returning to FIG. 3, as the flight pitch increases along the length of the auger 32, the granular material extends away from the pushing flight portion at an angle of repose 41. However, so long as the volume of material in the portion 42 is sufficiently great relative to the distance (and the resulting volume) between the flight portions, the granular material will abut the leading flight portion as well. However, when the flight pitch becomes greater than an extended portion length 43 defined by the volume of the granular material portion and the angle of repose 41, then gap 44 forms between the portion 42 of granular substance and the leading flight portion. In this manner, the portions of granular material become spaced from each other and spaced from the leading flight portion, which is the pushing flight portion of a leading portion. The auger 32 can be rotated to push an entire portion of granular material through the auger outlet 38 without the subsequent portion spilling over out of the auger outlet 38. Furthermore, because the portion 42 of the granular substance is provided in a pile angling away from the pushing flight portion at the angle of repose, if any spillover occurs, the volume of such spillover is minimized as the majority of the volume of the portion 42 is located furthest from the auger outlet 38.

Figure 4:
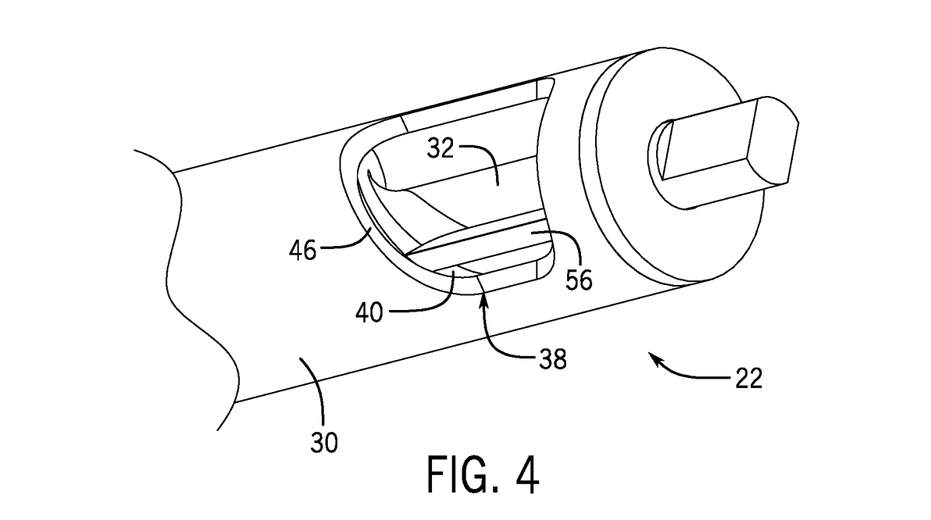
FIG. 4 is a partial enlarged view of an auger outlet.

FIG. 4 is an enlarged detailed view of a portion of the auger assembly 22 about the auger outlet 38. While not depicted in FIG. 4, a dispensing tube as shown in FIG. 1 may extend from the auger outlet 38. A portion of the auger 22 and a flight 40 thereof are visible through the auger outlet 38. The auger outlet 38 may include an edge 46 that is curved to match the shape of the flight 40 to create a closed position in the rotation of the auger 32. The matching shapes of the flight 40 and the edge 46 at the outlet also promotes complete dispense of the granular material. During dispense, the auger 32 can be rotated to advance the portions granular substance. As the portions of granular substance are sequentially advanced to the region of the auger outlet 38, the granular substance falls through the auger outlet 38. The auger 32 includes a wiper blade 56 that helps to push remaining granular substance out through the auger outlet 38. The wiper blade 56 extends radially away from the shaft 34 of the auger 32. The wiper blade 56 extends along an axis of the shaft 34 across the auger outlet 38. During rotation of the auger 34, the wiper blade 56 sweeps along the interior of the tube 30 across the auger outlet 38. This, along with the curved edge 46, helps to dispense all of the portion of the granular substance through the opening 38.

As noted above with respect to FIG. 3, due to the gap 44 between the leading flight and the next portion of granular substance spillover of the next portion is minimized or prevented. The auger 32 is controlled to stop rotation with the flight 40 in alignment with the edge 46 of the auger outlet 38. In embodiments, the exact positioning of the flight 40 relative to the edge 46 at the end of the dispense of the portion of granular substance may be within a tolerance. The flight 40 has a thickness, which in a merely exemplary and non-limiting manner may be 1/16 of an inch although it will be recognized may be thicker or thinner than this dimension. This flight thickness provides a tolerance within which the auger 32 may be rotated across the edge 46 while still blocking the auger outlet 38 from spillover from the subsequent portion 42. Additionally, because the next portion of granular material is separated from the leading flight portion by the gap 44, this provides a further guard against spillover should the auger 32 be rotated past the edge 46. In fact, in a further embodiment, the auger 32 may be rotated to move the flight 40 beyond the edge 46 to completely evacuate the portion of granular substance.

Figure 5:
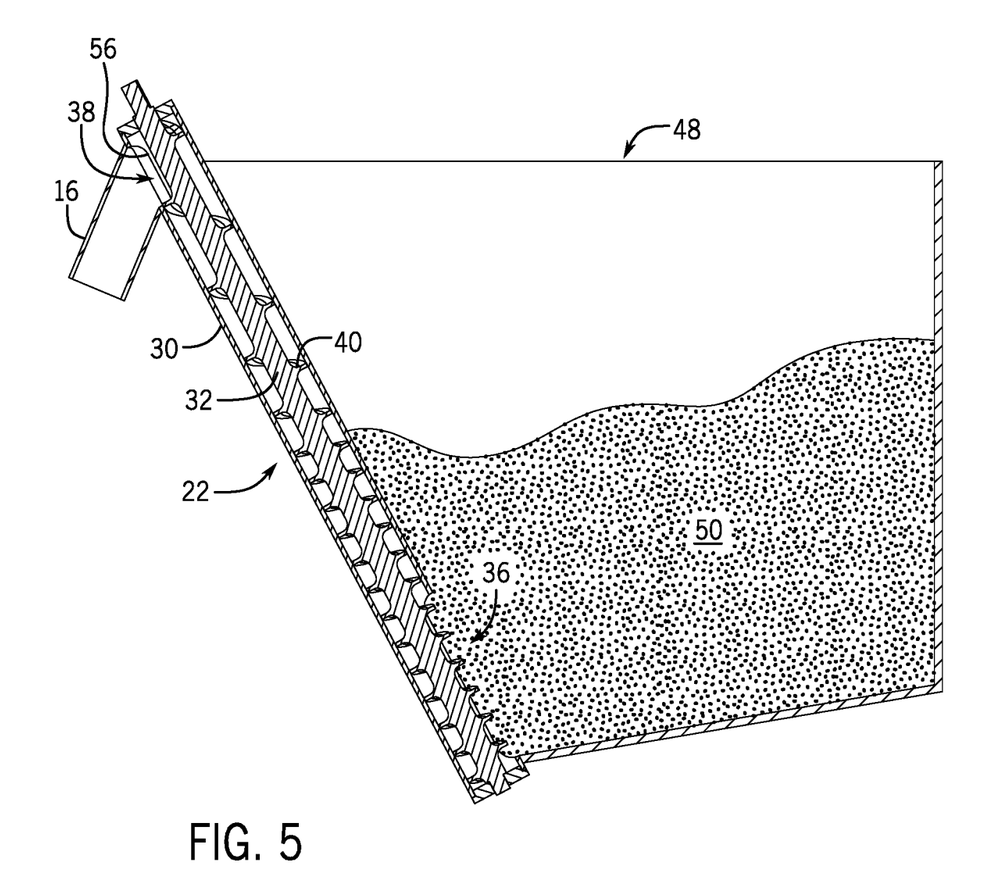
FIG. 5 depicts a sectional view of an exemplary embodiment of an auger and a hopper.

FIG. 5 provides an exemplary embodiment of an auger assembly 22 in arrangement with a hopper 48 filled with a granular substance 50, for example sugar. The hopper 48 exemplarily includes a plurality of side walls 48A and a floor 48B. It will be recognized that while the hopper 48 may take the general shape of a cuboid, that individual side walls 48A and or the floor 48B or portions of the floor 48B may be oriented at angles other than perpendicular to other portions of the hopper 48. The auger assembly 22 may be the same as that which is depicted in FIGS. 2-4, although it will be recognized that other embodiments of auger assemblies may be used in the configuration depicted in FIG. 5. Specifically, in the arrangement of FIG. 5, the auger assembly 22 is arranged at an angle greater than 45 degrees, and more particularly at an angle between 60 and 90 degrees. As a result, the auger assembly 22 is aligned more vertically than horizontally and extends along a side wall 48A of the hopper 48. The auger assembly 22 operates to lift the granular substance 50 out of the bottom of the hopper to dispense the granular substance into a dispensing tube 16 at a point elevated relative to at least a portion of the granular substance 50 held within the hopper 48.

In embodiments, the dispensing tube 16 may have a steep downward angle relative to the horizontal, for example at least 35 degrees, but in embodiments preferably between 45 degrees and 90 degrees or between 60 degrees and 90 degrees. In such embodiments, the auger outlet 38 may be needed to be elevated to a point above a portion or all of the hopper 48.

Figure 6:
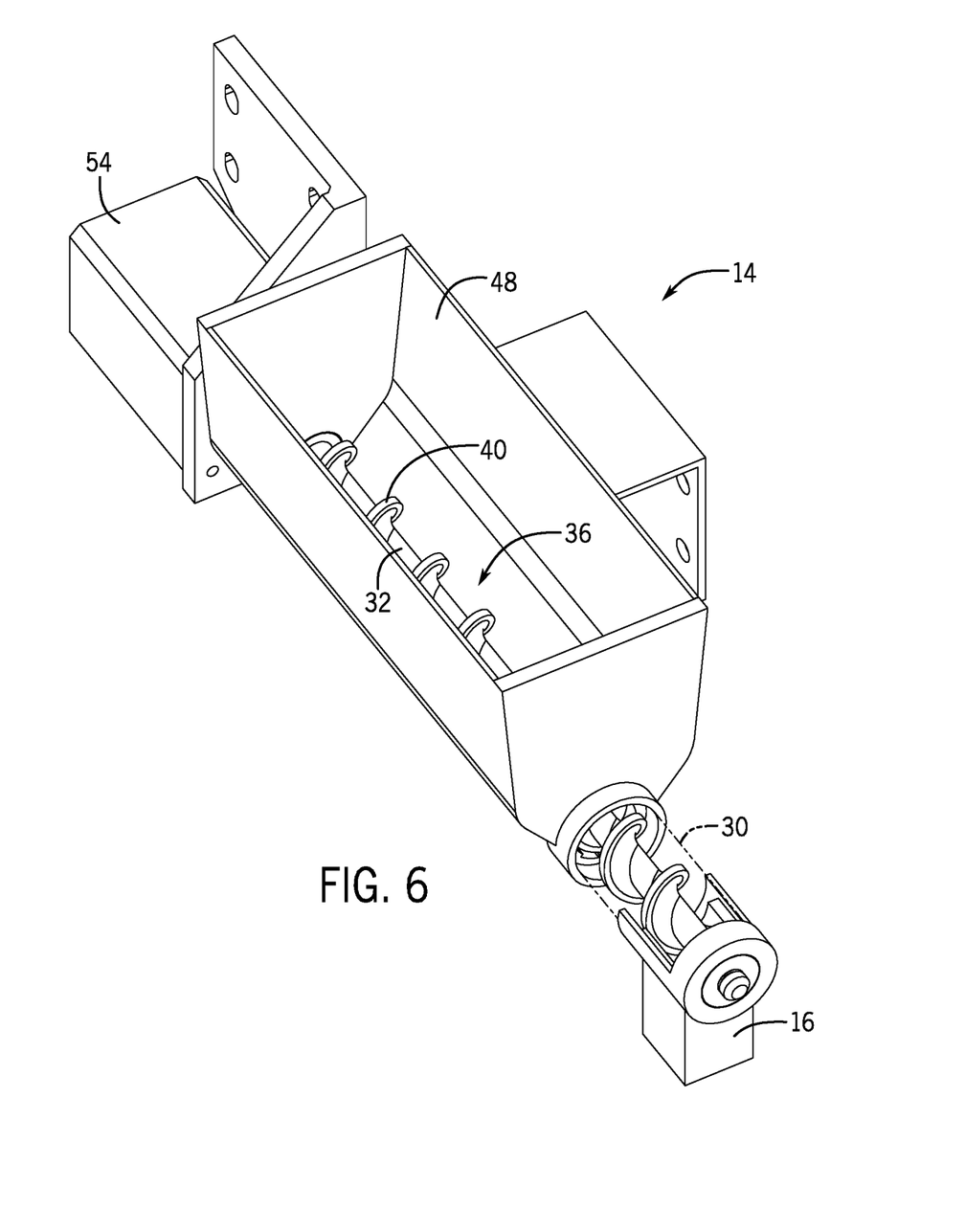
FIG. 6 is a perspective of an additional exemplary embodiment of a horizontal auger.
Figure 7:
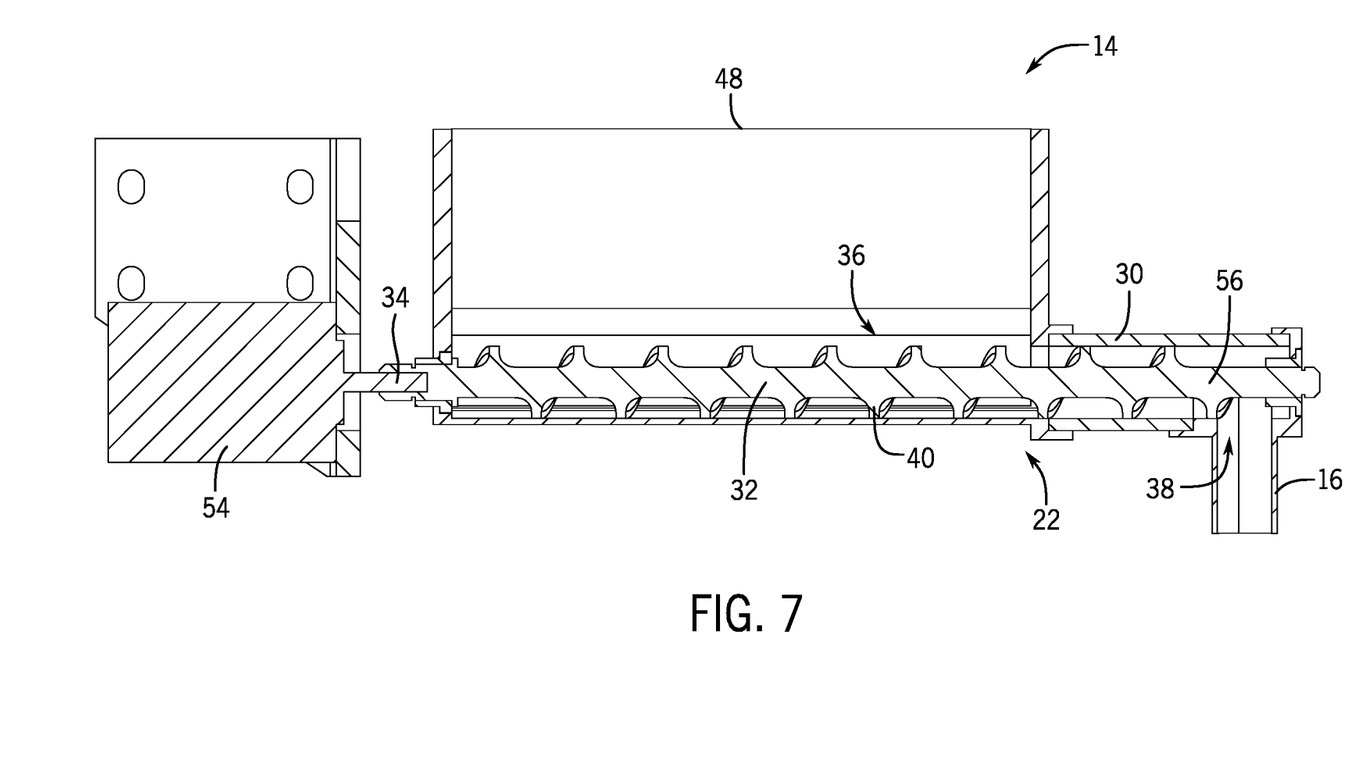
FIG. 7 is a side sectional view of the exemplary embodiment of a dispenser with a horizontal auger.
Figure 8:
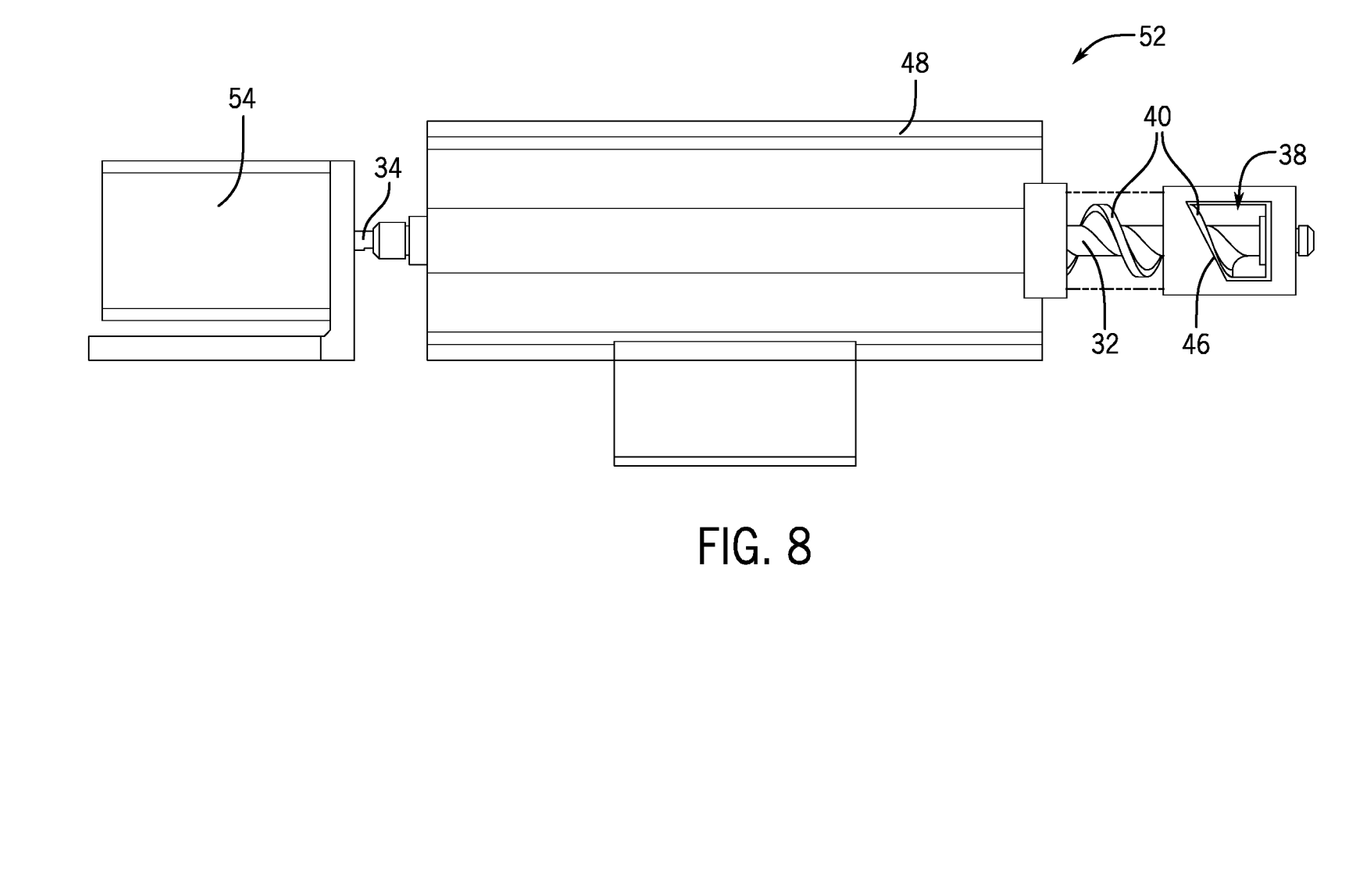
FIG. 8 is a bottom view of the dispenser with a horizontal auger.

FIGS. 6-8 depict an additional exemplary embodiment of a dispensing system 14. FIG. 6 is a perspective view of the dispensing system 14. FIG. 7 is a side sectional view of the dispensing system 14. FIG. 8 is a bottom view of the dispensing system 14. It will be recognized that embodiments of the dispensing system 14 may exemplarily be used as one or both of the dispensing systems 14A, 14B as shown in FIG. 1.

The dispensing system 14 depicts an electric motor 54 which is mechanically connected to the auger 32 by the auger shaft 34. The electric motor 54 may be a servomotor or a stepper motor, and operable by the associated controls. The electric motor 54 is operated as described herein to rotate the auger 32 through one or more revolutions to carry out the dispense of the granular substance, and to end the dispense at a desired position relative to the edge 46 of the auger outlet 38. As described above, that desired position may be in alignment with the edge 46 or out of alignment with the edge 46. In at least one embodiment, the stepper motor may be a high-torque stepper motor which may help to maintain alignment of the flight 40 with the edge 46 of the auger outlet 38, for example in an open loop control system. In embodiments, an encoder may be used to further help to maintain the flight 40 and edge 46 alignment. In other embodiments, a closed loop control may be used wherein a flag or other reference point, for example a hall effect sensor, is used to provide a feedback to keep the flight 40 aligned with the edge 46 at the end of the dispense. It will be recognized that similar techniques may be used to achieve other flight positions at the end of the dispense.

The controller (not depicted) of the electric motor 54 receives dispense instructions from the processor (FIG. 1) of the dispenser 10. The auger 32 extends through the floor 48B of the hopper 48 in a horizontal orientation. The floor 48B exemplarily slopes interior towards the auger assembly 22, and more specifically towards the auger inlet 36 of the auger assembly 22. The auger inlet 36 may exemplarily extend for the entire co-extensive length that the auger assembly 22 runs relative to the hopper 48, as depicted in FIGS. 6-8, or the auger inlet 36 may be a more narrowly defined region within the hopper, for example as shown in FIG. 2, 3, or 5. The auger 32 is a straight, single flight 40 auger with a pitch that may be larger than the diameter of the auger 32, although this may be different in other embodiments. The auger 32 includes a wiper blade 56 that helps to push remaining granular substance out through the auger outlet 38. As best depicted in FIG. 8, there is a position in the rotation of the auger in which the edge of a flight 40 is in alignment with the edge 46 of the auger outlet 38. During dispense, the auger 32 begins in the position depicted in FIG. 8 where the flight edge is aligned with the edge 46 of the auger outlet 38. The auger is rotated through at least one, but can include multiple, rotations appropriate to achieve the desired portion. In an exemplary embodiment, the volume between the flights is a fraction of an expected dispense portion such that multiple rotations of the auger are required to dispense the requested portion. In a merely exemplary embodiment the dispenser and auger 32 may be configured to dispense one gram of sugar per rotation of the auger 32. However, this is merely exemplary and it will be recognized that more or less sugar may be dispensed with each rotation of the auger 32, even while the size of the portion for each dispense may remain the same. In an embodiment, the auger 32 is rotated until it is stopped again at the same position which prevents additional granular substance from being pushed forward through the auger outlet 38.

Figure 10:
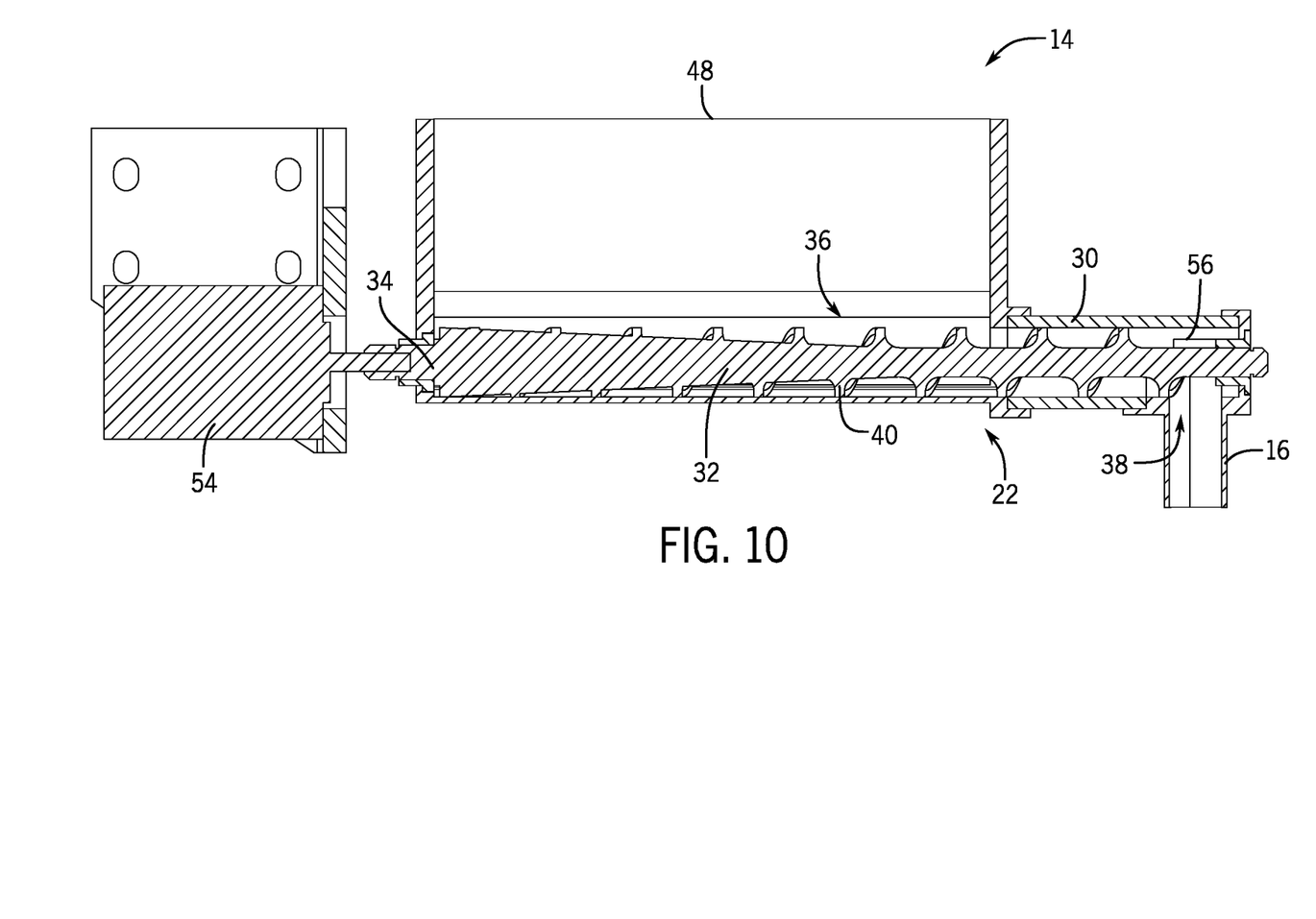
FIG. 10 depicts an additional exemplary embodiment of an auger assembly.

In still further exemplary embodiments, the auger 32 may be constructed in various alternative manners while remaining within the scope of the present disclosure. In FIG. 10, the auger 32 includes a variable diameter shaft 34. It has been discovered that embodiments wherein the auger shaft diameter is varied, for example as depicted in FIG. 10, that this can facilitate even removal of granular substance from the hopper in a manner that thus keeps the surface of the granular substance at the top of the hopper relatively level. This may facilitate hopper filling and may also provide the opportunity to sense product fill level, for example using time of flight sensors, optical break sensors, or other types of sensors as may be used to determine the volume of granular material remaining within the hopper. In another related embodiment, the diameter of the entire auger may be decreased along the length of the auger towards the dispense chute. The decrease in the auger diameter may be achieved with a decrease in the flight width, a decrease in the shaft diameter, or a combination of the two. In a still further exemplary embodiment, the width of the auger flights may be variable along the length of the auger. Such embodiment may also facilitate even leveling of the granular material stored within the hopper.

Figure 11:
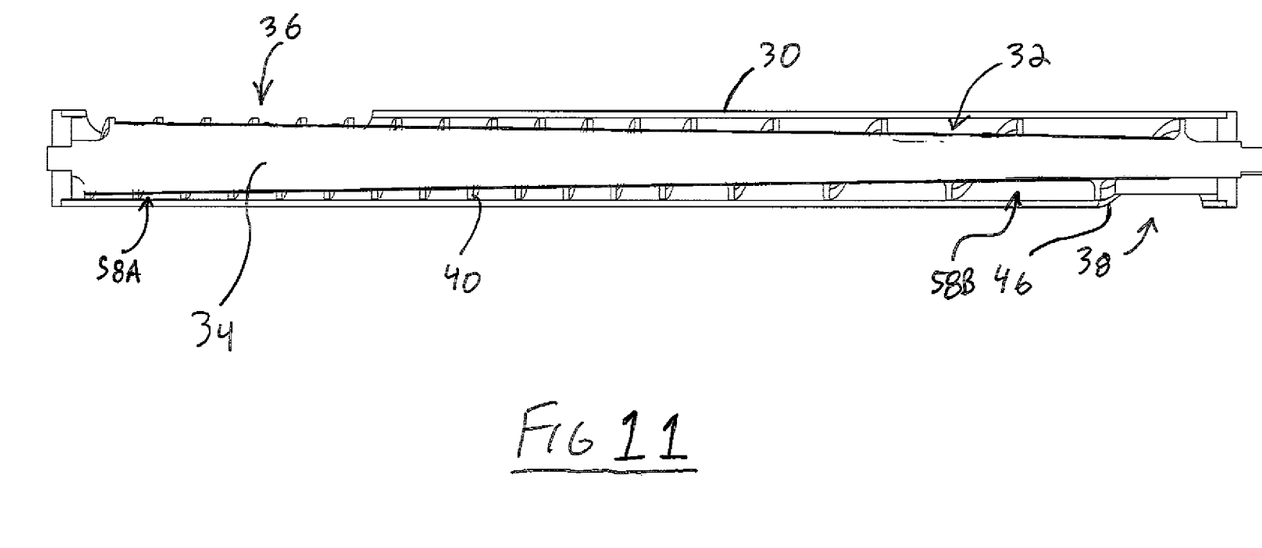
FIG. 11 depicts a further exemplary embodiment of an auger assembly.

FIG. 11 depicts a further example of an auger assembly 22. The auger 32 of the assembly exemplarily combines features of the augers depicted and described above with respect to FIG. 3 and FIG. 10. The auger assembly 22 includes a tube 30 within which the auger 32 rotates. While the tube 30 has a consistent diameter, the diameter of the shaft 32 decreases along the length of the auger 32 from the auger inlet 36 to the auger outlet 38. The diameter of the auger 32 is maintained constant by progressive increases in the width of the flight 40. Additionally, the pitch of the flight 40 increases along the length of the auger 32 from the auger inlet 36 to the auger outlet 38. While both of the auger configurations as depicted in FIGS. 3 and 10 have been found to be effective in creating a portion of granular material for dispense by a dispenser as described herein. The auger 32 exemplarily as depicted in FIG. 11 provides a greater change in volume between adjacent flight portions from one end of the auger 32 to the other. Exemplarily the volume at reference 58B is greater than the volume at reference 58A. Since this spacing volume increases both due to the decrease in the diameter of the auger shaft 34 as well as the increase in spacing between adjacent portions of the flight 40, a larger gap is produced between the portion of granular material pushed by the flight 40 and the leading flight portion. Therefore, dispensers incorporating the auger 32 of FIG. 11 may be particularly effective in preventing overrun of granular material after a portion is dispensed.

Figure 12:
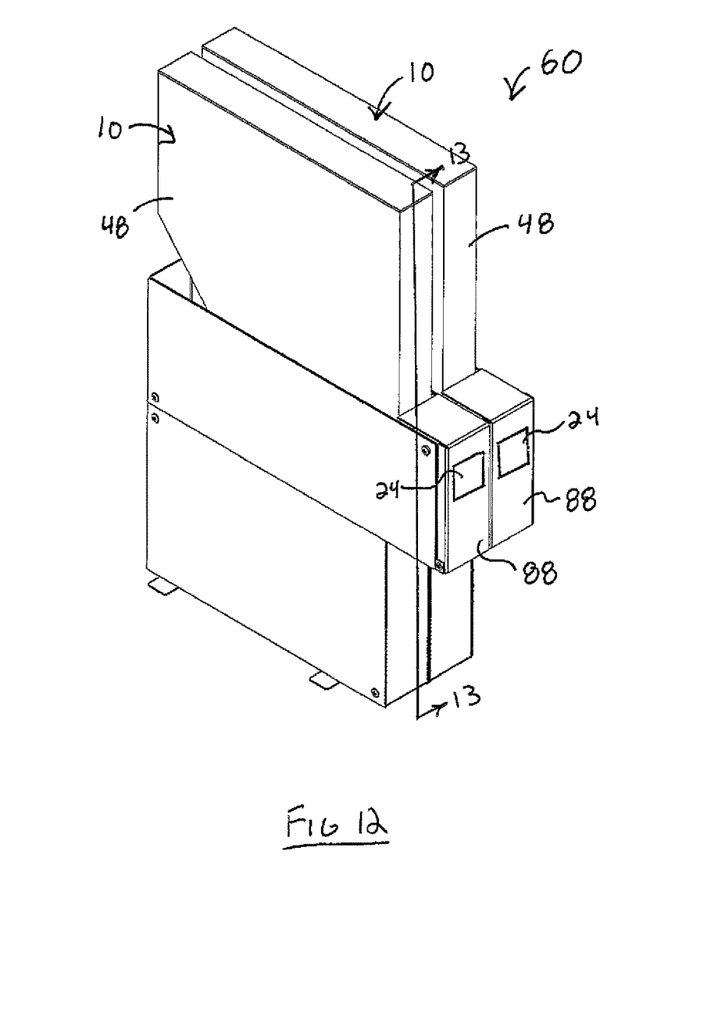
FIG. 12 depicts an exemplary embodiment of a granular dispenser.

FIG. 12 depicts an exemplary embodiment of a dispensing system 60. The dispensing system exemplarily includes two sugar dispensers 10. The individual sugar dispensers 10 are exemplarily elongated in a vertical dimension. Elongation in a vertical dimension, particularly in combination with a comparatively narrow width dimension, enable the multiple dispensers 10 to be positioned together as a unit. In an exemplary embodiment, the individual dispensers 10 of the dispensing system 60 may be communicatively connected and/or commonly controlled. However, it will be recognized that while the dispensers 10 may be physically connected or not physically connected, that the dispensers may be operated and controlled, including systems wherein communication is made with a KMS as described previously.

The dispensers 10 include hoppers 48 in which the granular material is stored prior to dispense. The hoppers 48 may be reusable and refillable, while in other embodiments may be single use packaging and disposable. The hoppers 48 can be received into the dispenser 10 vertically, while in the embodiment shown, a front panel 88 may be hingedly or otherwise pivotably connected to open the interior of the dispenser in a forward direction for loading of the hopper 48. The front panel 88 further includes the interface 24.

Figure 13:
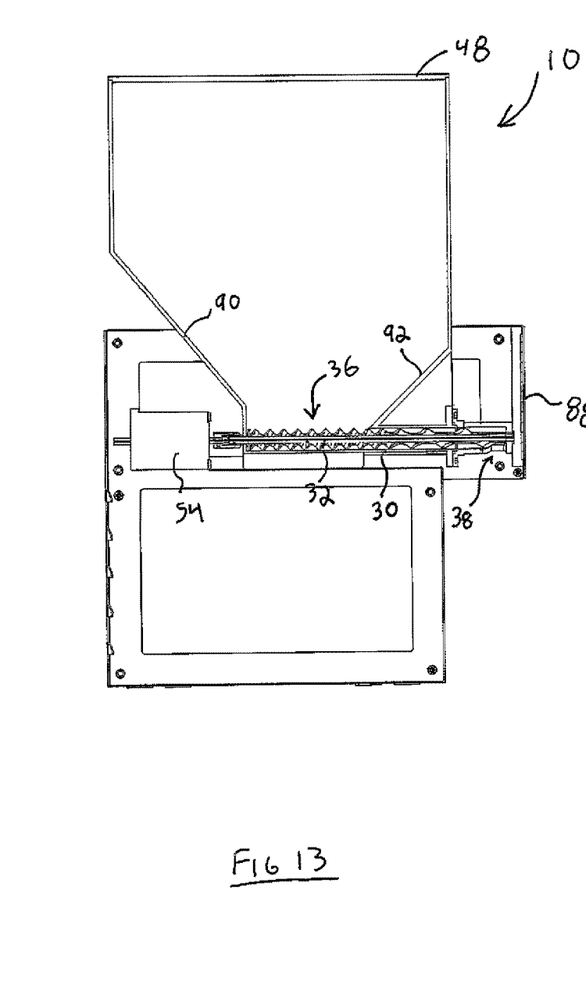
FIG. 13 is a cross-sectional view taken along line 13-13 of FIG. 12.

FIG. 13 is a cross-sectional view taken along line 13-13 of FIG. 12. In this cross-section, the interior of the hopper 48 is shown. The hopper 48 includes a rear angled wall 90 and a forward angled wall 90 which direct the granular material into the auger inlet 36 and the auger 32 positioned horizontally within the bottom of the hopper 48. The forward angled wall 92 helps to reduce the size of the auger inlet 36 relative to the length of the auger 32, such that a portion of the auger 32 extends within the tube 30 beyond the auger inlet 36. The pitch of the flight 40 remains consistent through the auger inlet 36, but lengthens along the portion of the auger 32 that is interior of the tube 30. As described above, this creates separation between the portions to be dispensed through the auger outlet 38.

In a still further exemplary embodiment, the auger may be formed in two parts wherein the section of the auger that is immersed in the hopper is connected to a section of the auger between the hopper and the dispensing tube through a one way clutch. In such an embodiment, the auger may dispense when rotated forward and agitate the stored granular substance held within the auger when rotated in reverse. By providing the auger in two parts, this agitation process may be achieved without disturbing the portioned granular product held by the second part of the two part auger.

In a still further exemplary embodiment, the auger may be periodically operated in reverse to withdraw all of the granular substance, for example held in the spaces between the flight of the auger within the tube back into the hopper while this reversal movement also serves to agitate the granular substance held within the hopper between dispenses which helps to prevent solidification, bridging, and channeling within the stored granular material. A subsequent dispense may occur by operation of the auger in the forward rotation. In a completely exemplary and non-limiting embodiment, a dispense cycle may include three forward rotations of the auger while an agitation cycle may use seven rotations in a reverse direction of the auger.

Figure 9:
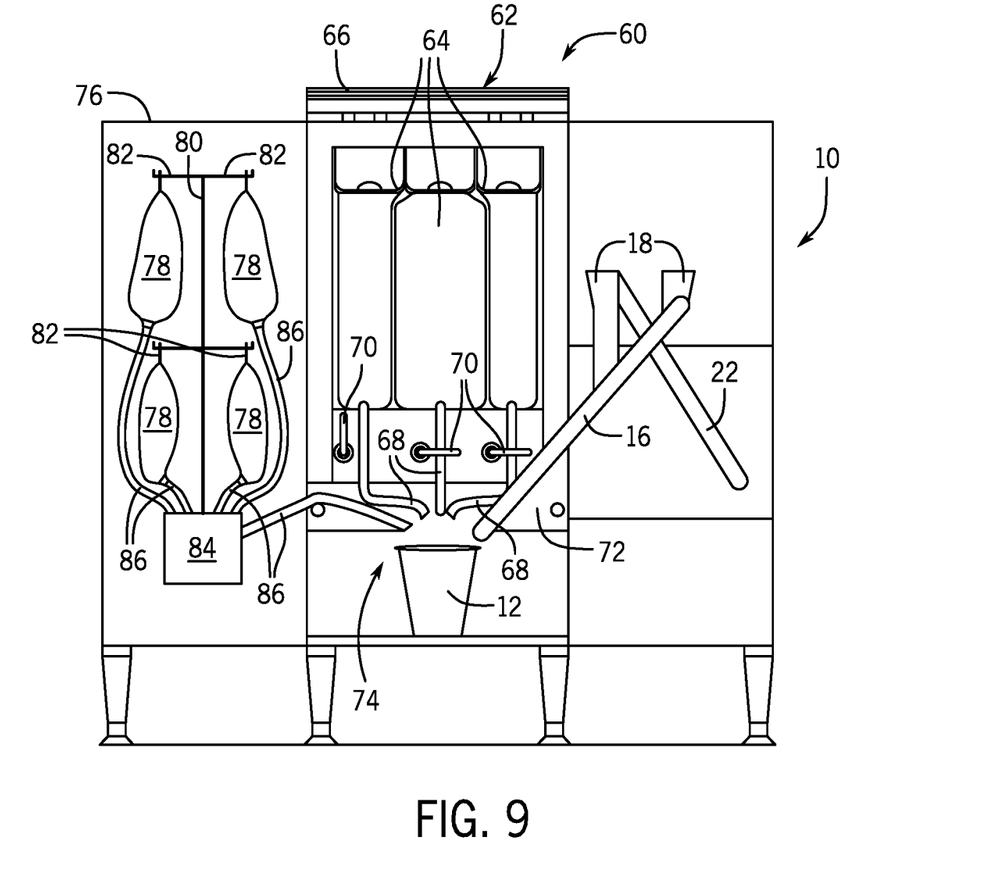
FIG. 9 depicts an exemplary embodiment of a combined additive dispenser.

FIG. 9 depicts a still further exemplary embodiment of a custom beverage preparation system 60. The system 60 exemplarily includes a creamer dispenser 62, which is exemplarily shown and described in further detail in Applicant's co-owned U.S. Pat. No. 8,844,768 entitled "Liquid Dispenser with Storage Tanks" and U.S. Pat. No. 9,533,869 entitled "Pinch Valve for Dispenser for a Liquid," both of which are incorporated by reference herein in their entireties. The creamer dispenser 62 exemplarily includes storage tanks 64, but also storage bags or the like, which are configured to hold volumes of liquids, for example dairy and non-dairy creamers. It will be recognized that as used herein "creamer" refers the general type of additive being dispensed, and includes dairy including but not limited to skim milk, whole milk, cream, and half-and-half, as well as non-dairy creamers, and other creamers as well including but not limited to soy milk or almond milk. The creamer dispenser 62 may further include a refrigerated cabinet 66 which maintains the temperature of the products stored therein. The substances are exemplarily provided in flexible tubes 68 and the flow of the liquids controlled by pinch valves 70. A manifold 72 is provided that directs the flexible tubes a dispensing location 74 at which a cup 12 is placed to receive the dispensed substances. The granular dispense 10 as described above is connected to the creamer dispenser 62 and a dispensing tube 16 provided from the auger outlet 18 through the manifold 72 to the dispense point 74. Additionally, a flavoring dispenser 76 may be connected to the creamer dispenser 62. The flavoring dispenser 76 may include a plurality of flavoring containers 78.

In an exemplary embodiment, the flavoring containers 78 are bags exemplary constructed of a flexible plastic containing the flavoring, which exemplarily is a liquid and/or concentrated form prior to dispense. The bags 78 may be removably mounted to a support board 80. In an embodiment, the support board 80 provides a plurality of hooks 82 which extend out of the support board 80 and the bags 78 are hung from one or more the hooks 82. The bags 78 are associated with one or more pumps 84 that are operated by the controller (not depicted) to dispense a requested volume of the associated flavor upon such a command.

In exemplary embodiments, one or more pumps 84 are peristaltic pumps. It will be recognized that in other embodiments other forms of pumps may be used.

Flexible tubing 86 extends from the respective bags 78 to the one or more pumps 84. In an embodiment, the flexible tubing 86 may exemplarily be integral to the bag 78 while in another embodiment, the flexible tubing 86 may be a separate component that inserts into the bag 78. In embodiments, the flexible tubing 86 may be constructed of a flexible plastic or polymeric material while it will be recognized that in embodiments, two or more materials may be used to construct the flexible tubing 86 and/or bag 78, for example such as to provide a material of particularly well suited flexibility and/or pliability characteristics for actuation by the pump 84 which may be a peristaltic pump. While only one flexible tube 86 is depicted for exemplary purposes, it will be understood that downstream of the pump 84, the flexible tube further extends exemplarily through the manifold 72 to the dispenser paint 74.

In operation, the custom beverage preparation system 60 can exemplarily receive direct user inputs or may receive instructions from a KMS or in other embodiments may receive a barcode input of a custom beverage order as may be printed on a label affixed to a cup. The system 60 may operate to dispense a combination of flavoring, creamer, and granular substances into the cup 12 either before or after the base beverage has been put in the cup.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dispenser of portioned edible granular material for a beverage, the dispenser comprising:
   a hopper configured to receive the edible granular material, the hopper comprising at least a floor defining a bottom of the hopper;
   a tube connected to and extending away from the hopper;
   an auger comprising an auger shaft having a shaft diameter and at least one flight about the shaft with a pitch distance between successive flight portions of the at least one flight, the auger comprising a first auger portion positioned at the bottom of the hopper wherein the pitch distance is consistent between successive flight portions of the first auger portion and a second auger portion surrounded by the tube, wherein the pitch distance and a pitch volume increases between successive flight portions of the second auger portion; and
   an outlet that extends through a side of the tube located at an end of the tube distal from the hopper in a direction perpendicular to an axis of the auger shaft, and the outlet comprises a curved edge, wherein a profile of the curved edge matches a portion of the auger that rotates past the curved edge;
   wherein the auger comprises a wiper blade that extends from the at least one flight along a length of the auger shaft to extend across the outlet in a direction away from the at least one flight;
   wherein the pitch volume of the first auger portion defines a dispense portion of the edible granular material between adjacent flight portions and the dispense portion remains consistent between adjacent flight portions in the second auger portion.

2. The dispenser of claim 1, wherein the at least one flight is a single flight with a pitch distance between successive flight portions, and the pitch distance increases between successive flight portions of the single flight in the second auger portion.

3. The dispenser of claim 1, wherein the pitch volume is based upon a flight width and the pitch distance.

4. The dispenser of claim 1, wherein the shaft diameter tapers along at least a portion of a length of the auger shaft from a hopper end of the auger shaft to an outlet end of the auger shaft, while the auger maintains a constant outer diameter of the auger along the length of the auger.

5. The dispenser of claim 1, further comprising:
   a sensor positioned within the hopper, the sensor directed into an interior of the hopper at the edible granular material; and
   a processor communicatively connected to the sensor, wherein the processor receives a signal from the sensor and determines an amount of edible granular material remaining within the hopper from the signal from the sensor and produces an indication of the determined amount.

6. The dispenser of claim 1, wherein the at least one flight has a variable flight angle relative to an axis of the auger shaft along the length of the shaft.

7. The dispenser of claim 1 further comprising:
   an electric motor connected to the auger shaft of the auger and operable to selectively rotate the auger;
   a processor communicatively connected to the motor and operable to operate the motor, wherein the processor receives at least one input regarding a dispense of edible granular material and operates the electric motor to rotate the auger through a plurality of rotations according to the at least one input to dispense the portion of the edible granular material.

8. The dispenser of claim 7, wherein the electric motor is operated by the processor to rotate the auger to advance the edible granular material between successive flight portions of the auger to the outlet for dispense.

9. The dispenser of claim 8, wherein the processor operates the electric motor to stop rotation of the auger with the portion of the at least one flight that rotates past the curved edge in alignment with the profile of the curved edge of the outlet.

10. The dispenser of claim 7, further comprising a user interface communicatively connected to the processor, wherein the user interface is operable to receive a user input regarding a dispense of edible granular material and the user input is communicated to the processor.

11. A system for dispensing additives into a beverage, the system comprising:
    a first dispense location, the first dispense location configured to receive a beverage receptacle;
    a granular dispenser for dispensing portioned edible granular material into the beverage receptacle at the first dispense location, the granular dispenser comprising:
      a hopper configured to receive the edible granular material, the hopper comprising at least a floor defining a bottom of the hopper;
      an auger comprising an auger shaft having a shaft diameter and at least one flight about the shaft with a pitch distance between successive flight portions of the at least one flight, and the auger comprises a first auger portion and a second auger portions with the first auger portion positioned at the bottom of the hopper wherein the pitch distance is consistent between successive flight portions of the first auger portion and wherein the pitch distance and a pitch volume increases between successive flight portions of the second auger portion;
      a tube connected to the hopper and surrounding the second portion of the auger, the tube extending away from the hopper;

an outlet that extends through a side of the tube and located at an end of the tube distal from the hopper in a direction perpendicular to an axis of the auger shaft, and the outlet comprises a curved edge, wherein a profile of the curved edge matches a portion of the auger that rotates pates the curved edge; and an electric motor connected to the auger shaft of the auger and operable to selectively rotate the auger to dispense the portion of edible granular material from the hopper to the first dispense location;

wherein the auger comprises a wiper blade that extends from the at least one flight along a length of the auger shaft to extend across the outlet in a direction away from the at least one flight;

wherein the pitch volume of the first auger portion defines a dispense portion of the edible granular material between adjacent flight portions and the dispense portion remains consistent between adjacent flight portions in the second auger portion; and a processor communicatively connected to the electric motor and operable to control the motor to dispense the portion of edible granular material.

12. The system for dispensing additives into a beverage of claim 11, wherein the granular dispenser is a first granular dispenser, further comprising:

a second granular dispenser for dispensing portioned edible granular material into the beverage receptacle at the first dispense location, the second granular dispenser comprising:

a hopper configured to receive the edible granular material, the hopper comprising at least a floor defining a bottom of the hopper;

an auger comprising an auger shaft having a shaft diameter and at least one flight about the shaft and the auger comprises first and second auger portions with the first auger positioned at the bottom of the hopper and a pitch volume increases between flight portions at a same rotational position about the auger;

a tube connected to the hopper and surrounding the second portion of the auger, the tube extending away from the hopper;

an outlet through the tube located at an end of the tube distal from the hopper and oriented relative to the first dispense location; and an electric motor connected to the auger shaft of the auger and operable to selectively rotate the auger to dispense the portion of edible granular material from the hopper to the first dispense location;

wherein the processor is communicatively connected to the electric motor of the second granular dispenser and is operable to control the electric motor of the second granular dispenser to dispense the portion of edible granular material from the hopper of the second granular dispenser to the first dispense point.

13. The system of claim 11, further comprising a kitchen management system (KMS), wherein the KMS receives customer orders and identifies instructions for edible granular materials in the customer orders, the instructions for the edible granular materials being provided from the KMS to the processor, wherein the processor operates the electric motor to dispense the portion of edible granular material from the hopper to the first dispense point.

14. The system of claim 11 further comprising a creamer dispenser, the creamer dispenser comprising:

a refrigerated cabinet within which a source of creamer is stored in an environmentally controlled condition;

a flexible tube that extends from the source of creamer to the first dispense point;

at least one pinch valve that selectively occludes the flexible tube; and a peristaltic pump arranged about the flexible tube and operable to move a portion of creamer from the source, through the tube to dispense the portion of creamer at the first dispense point;

wherein the processor is communicatively connected to the peristaltic pump and operates the peristaltic pump to control a dispense of creamer according to a customer order.

15. The system of claim 14 further comprising a flavoring dispenser, the flavoring dispenser comprising:

a flavoring container filled with liquid flavoring;

a flexible tube that extends from the flavoring container to the first dispense point;

at least one pinch valve that selectively occludes the flexible tube; and a peristaltic pump arranged about the flexible tube and operable to move a portion of the liquid flavoring from the flavoring container, through the tube to dispense the portion of liquid flavoring at the first dispense point;

wherein the processor is communicatively connected to the peristaltic pump and operates the peristaltic pump to control a dispense of liquid flavoring according to a customer order.

* * * * *